US010242005B2

(12) United States Patent
Patel et al.

(10) Patent No.: US 10,242,005 B2
(45) Date of Patent: *Mar. 26, 2019

(54) METHOD AND SYSTEM FOR VOICE BASED MEDIA SEARCH

(71) Applicant: TiVo Solutions Inc., San Jose, CA (US)

(72) Inventors: Mukesh Patel, Fremont, CA (US); Lu Silverstein, Alviso, CA (US); Srinivas Jandhyala, Alviso, CA (US)

(73) Assignee: TIVO SOLUTIONS INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/949,754

(22) Filed: Apr. 10, 2018

(65) Prior Publication Data

US 2018/0232368 A1   Aug. 16, 2018

Related U.S. Application Data

(63) Continuation of application No. 15/645,526, filed on Jul. 10, 2017, now Pat. No. 9,971,772, which is a continuation of application No. 13/665,735, filed on Oct. 31, 2012, now Pat. No. 9,734,151.

(51) Int. Cl.
  *G06F 17/30*   (2006.01)
  *G06F 17/27*   (2006.01)
  *G10L 15/26*   (2006.01)

(52) U.S. Cl.
  CPC .............. *G06F 17/30017* (2013.01)

(58) Field of Classification Search
  USPC .............................................. 704/9
  See application file for complete search history.

(56) References Cited

U.S. PATENT DOCUMENTS

| | | | | |
|---|---|---|---|---|
| 2004/0102959 | A1* | 5/2004 | Estrin | G06F 21/32 704/8 |
| 2004/0220926 | A1* | 11/2004 | Lamkin | G06F 17/30017 |
| 2011/0098917 | A1* | 4/2011 | LeBeau | G01C 21/265 701/533 |
| 2011/0286584 | A1* | 11/2011 | Angel | H04M 3/42221 379/88.02 |
| 2012/0016678 | A1* | 1/2012 | Gruber | G06F 17/3087 704/275 |
| 2012/0035924 | A1* | 2/2012 | Jitkoff | G01C 21/3608 704/235 |

(Continued)

*Primary Examiner* — Daniel C Washburn
*Assistant Examiner* — Timothy Nguyen
(74) *Attorney, Agent, or Firm* — Haley Guiliano LLP

(57) ABSTRACT

Voice-based input is used to operate a media device and/or to search for media content. Voice input is received by a media device via one or more audio input devices and is translated into a textual representation of the voice input. The textual representation of the voice input is used to search one or more cache mappings between input commands and one or more associated device actions and/or media content queries. One or more natural language processing techniques may be applied to the translated text and the resulting text may be transmitted as a query to a media search service. A media search service returns results comprising one or more content item listings and the results may be presented on a display to a user.

20 Claims, 5 Drawing Sheets

(56) References Cited

U.S. PATENT DOCUMENTS

| | | | | |
|---|---|---|---|---|
| 2012/0201362 A1* | 8/2012 | Crossan | ............... | G10L 15/26 |
| | | | | 379/88.01 |
| 2012/0245936 A1* | 9/2012 | Treglia | ............ | G06F 17/30746 |
| | | | | 704/235 |
| 2014/0122059 A1* | 5/2014 | Patel | ............... | G06F 17/30017 |
| | | | | 704/9 |

* cited by examiner

METHOD AND SYSTEM FOR VOICE BASED MEDIA SEARCH

CROSS-REFERENCE TO RELATED APPLICATION

This application is a continuation of U.S. patent application Ser. No. 15/645,526, filed Jul. 10, 2017, which is a continuation of U.S. patent application Ser. No. 13/665,735, filed Oct. 31, 2012, now U.S. Pat. No. 9,734,151, the contents of which are hereby incorporated by reference herein in their entireties.

FIELD OF THE INVENTION

Embodiments of the invention generally relate to techniques for using voice-based input to operate a media device and to search for media content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Digital Video Recording systems ("DVRs") and other similar media devices enable users to consume a wide variety of media and have revolutionized the way users watch and record multimedia content. In general, user interface systems found in DVRs and other media devices communicate with a display screen and display an interactive interface on a display device. Users typically interact with such user interface systems using remote controls and other physical input devices. A drawback of these physical input devices is that it is often cumbersome for a user to express commands and queries to find and interact with multimedia content available to the user. For example, if a user desires to search for movies that contain the user's favorite actor, the user may be required to manually key in, using a remote control or similar device, the actor's name and other elements of a relevant search command.

In some systems, voice input is used to operate various user devices. However, traditional voice-based input systems are generally unaware of the context of individual user's voice requests and/or what particular commands each user may use to express a desired device action or search for multimedia content. Consequently, voice-based input systems often fail to accurately recognize users' voice commands resulting in non-performance of requested device actions and/or the retrieval of multimedia content search results that are irrelevant to users' intended queries.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
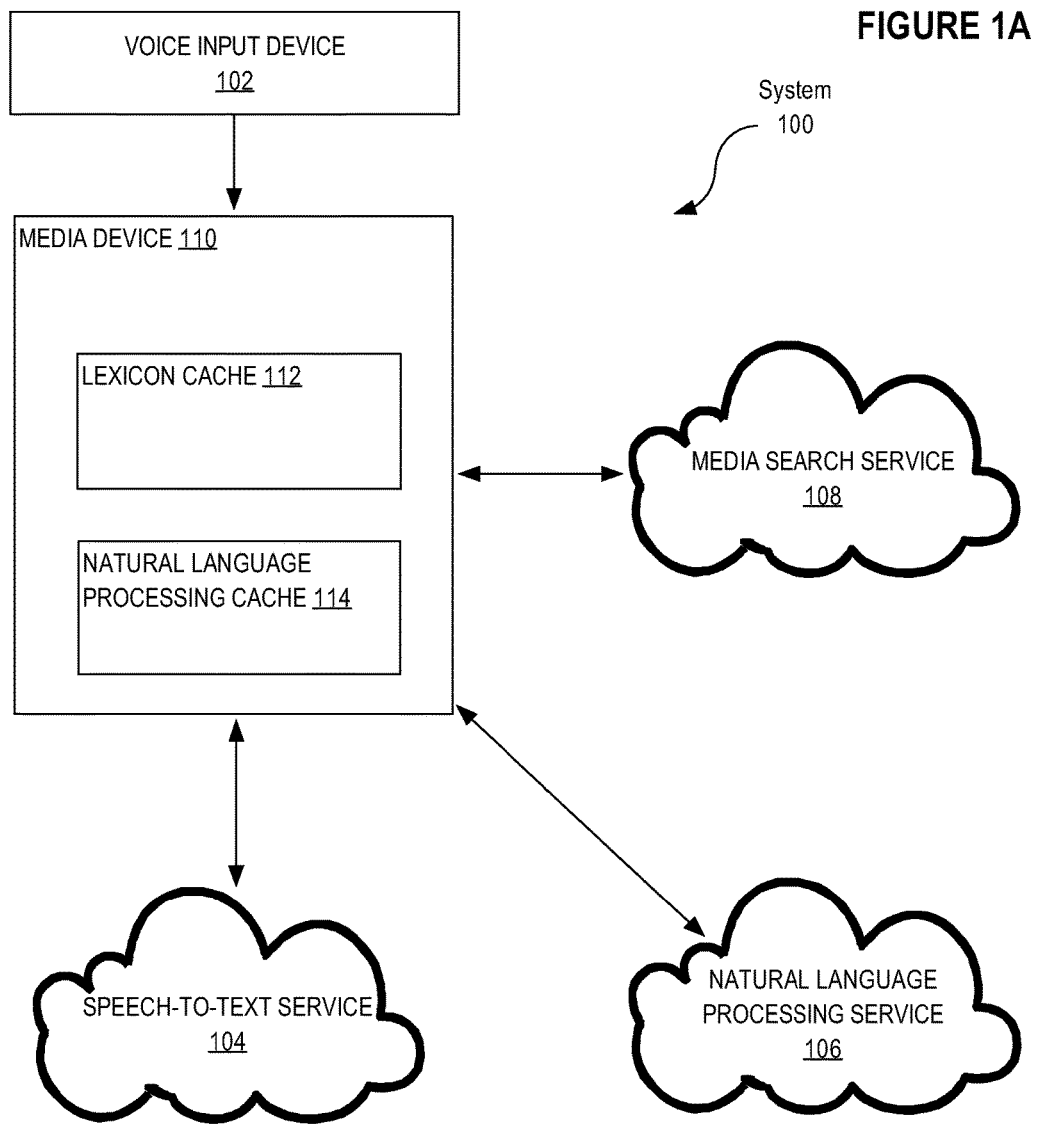
FIG. 1A is a block diagram illustrating an example system in accordance with an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example features are described according to the following outline:

1.0 General Overview
2.0 System Architecture
3.0 Example Media Device
4.0 Receiving Voice Input
5.0 Processing Voice Input
   5.1 Speech-To-Text Translation Service
   5.2 User Modification of Translated Voice Input
   5.3 Device Lexicon Cache
   5.4 Natural Language Processing Cache
   5.5 Natural Language Processing
   5.6 Media Content Search
6.0 Processing Voice Input Search Results
   6.1 Search Result Weighting
   6.2 Presentation and User Selection of Results
   6.3 Collection of Audience Research and Measurement Data
7.0 Hardware Overview
8.0 Extensions and Alternatives 1.0 General Overview In an embodiment, voice input is received by a media device via one or more audio input devices. In an embodiment, at least a portion of the received voice input is transmitted to a speech-to-text service for translation into a textual representation of the voice input. In response to receiving at least a portion of the voice input, the speech-to-text service translates the received voice input and transmits a textual representation of the voice input to the media device. In an embodiment, the translated textual representation of the voice input is presented to a user and the user may modify one or more portions of the textual representation and/or provide confirmation of the accuracy of the textual representation.

In an embodiment, the textual representation of the voice input is used to search a device lexicon cache storing one or more mappings between textual representations of media device commands and one or more device actions. For example, device actions may include actions performed locally on a media device such as changing the channel, scheduling a media content recording, listing recorded content, etc., or the device actions may be requests transmitted to other services. In response to detecting a device lexicon cache entry corresponding to the textual representation of the voice input, the media device may cause the one or more actions associated with the cache entry to be performed.

In another embodiment, the device lexicon cache may store one or more mappings between voice patterns and device actions. For example, the voice patterns may be derived from previously received user voice samplings. In an embodiment, a voice input sampling derived from received voice input is used to search a device lexicon cache storing one or more mappings between voice patterns and one or more media device actions. In response to detecting a device lexicon cache entry corresponding to the voice input sampling, the media device may cause the one or more actions associated with the cache entry to be performed. In an embodiment, the mappings between voice patterns and device actions may be stored in conjunction with or separately from the cache entries storing mappings between textual representations of voice input and device actions.

In an embodiment, a signature is generated for the textual representation of the voice input and a natural language processing cache is searched. For example, in an embodiment, a signature may be a hash value computed using the textual representation as input. The natural language processing cache may store one or more mappings between text signatures and one or more device actions and/or media search queries. In response to detecting a natural language processing cache entry corresponding to the signature, the media device may perform the one or more associated actions and/or send an associated media search query to a media search service. In an embodiment, one or more natural language processing techniques may be used to further process the text representing the translated voice input. In an embodiment, the textual representation of the voice input is transmitted to a natural language processing service to perform the one or more natural language processing techniques.

In an embodiment, the textual representation of the user voice input may be transmitted as one or more queries to a media search service during one or more of the voice input processing steps identified above. In an embodiment, based on the one or more transmitted queries, a media search service returns results comprising one or more media content item listings. In an embodiment, at least a portion of the one or more of the content item listings may be presented on a display and a user may select one or more of the content item listings using an input device. In an embodiment, selection of one or more of the content item listings may be indicated by additional voice input received from a user.

The techniques described herein generally enable a user to control a media device using the user's voice. For example, a user may express a voice command "show my recorded shows." The voice command may be sent to a DVR from an audio input device over a local network. In response to receiving the voice command, the DVR may gather data corresponding to the user's recorded shows. The data for the recorded shows may then be sent from the DVR to a connected display device. The user may further express a title or listing number (e.g., "play content A") corresponding to a listing included in the data displayed on the display device. For example, a user voice command "play content A" may be sent as a command to the DVR over the local network causing "content A" to be streamed to the media device for display to the user. Another example of voice based command and control of a media device includes a DVR comprising tuners to tune to one or more broadcast television channels. A user using a remotely located media device connected to a DVR over a local network may voice a command to view the Electronic Program Guide (EPG). The request may be sent to the DVR over the local network and cause the DVR to send the EPG data to the remotely located device for display. The user may further desire to view a particular television channel based on the received EPG data. For example, the user may voice a command such as "go to channel 11," the command causing media device to tune to channel 11 and the content being broadcast on that channel to be displayed on a connected display device.

2.0 System Architecture

Although a specific computer architecture is described herein, other embodiments of the invention are applicable to any architecture that can be used to perform the functions described herein.

FIG. 1A illustrates an example system 100 according to an embodiment of the invention which includes a media device 110, voice input device 102, speech-to-text service 104, natural language processing service 106, and media search service 108. Each of these devices and services are presented to clarify the functionalities described herein and may not be necessary to implement one or more embodiments. Furthermore, devices and services not shown in FIG. 1 may also be used to perform the functionalities described herein.

In an embodiment, media device 110 generally represents any media device comprising a processor and configured to present media content. A media device 110 may refer to a single device or any combination of devices (e.g., a set-top box cable receiver, an audio receiver, over the top (OTT) display devices, and a television set, etc.) that may be configured to present media content. Examples of a media device 110 include one or more of: receivers, digital video recorders, digital video players, televisions, monitors, Blu-ray players, audio content players, video content players, digital picture frames, hand-held mobile devices, computers, printers, etc. The media device 110 may present media content by playing the media content (e.g., audio and/or visual media content), displaying the media content (e.g., still images), or by any other suitable means. One or more individual components that may be included in the media device 110 are described below with reference to FIG. 1B. In an embodiment, media device comprises device lexicon cache 112 and natural language processing cache 114, generally representing local and/or remote memory storage used to store data associated with the techniques described herein. In an embodiment, device lexicon cache 112 and/or natural language processing cache 114 may be integrated into media device 110 or may be remotely accessible.

In an embodiment, two or more media devices 110 may be networked on a local network, enabling interaction between the media devices. An example of the voice based capabilities between networked media devices includes searching for recorded content on a DVR from an OTT device over the local network.

In an embodiment, voice input device 102 generally represents one or more microphones or other voice recognition devices that can be used to receive voice input from one or more users. In an embodiment, a microphone may be a device separate from media device 110, integrated as part of a media device 110, or part of another device (e.g., a remote control, a phone, a tablet, a keyboard, etc.) that is communicatively coupled with the media device 110. The remote devices may be communicatively coupled with the media device 110 (e.g., via USB, Bluetooth, infrared, IR, wireless, etc.). In an embodiment, voice input device 102 may comprise multiple microphones enabled to detect sound, identify user location, etc. In an embodiment, the media device 110 may include functionality to identify media content being played (e.g., a particular program, a position in a particular program, etc.) when audio input is received (e.g., via a microphone) from a user. For example, media device 110 may identify particular media content being played by a media device 110 based on a fingerprint derived from the media content being played. A fingerprint derived from particular media content may, for example, be based on projecting the intensity values of one or more video frames onto a set of projection vectors and obtaining a set of projected values. A fingerprint derived from particular media content may be sent to a fingerprint database and the particular media content may be identified based on fingerprints of known media content stored in the fingerprint database.

In an embodiment, speech-to-text service 104 generally represents any software and/or hardware for translating audio data including one or more user voice portions into a textual representation. In an embodiment, speech-to-text service 104 receives audio data representing voice input from media device 110, translates the audio data into a textual representation, and provides the textual representation to a media device 110, for example, through a network, communication connection, any local network, etc.

In an embodiment, natural language processing service 106 generally represents any service that is enabled to process text using one or more natural language processing techniques including parsing the text and categorizing the parsed text into one or more natural language components. In an embodiment, natural language processing service 106 receives textual data (e.g., from media device 110, speech-to-text service 104, etc.), performs one or more natural language processing techniques using the textual data as input, and provides a result as text. The results may include various transformations to the input text, for example, the filtering of certain words and/or other modifications based on the applied natural language processing techniques.

In an embodiment, media search service 108 generally represents a service that receives search queries for media content and other associated program data. In an embodiment, program data comprises program titles, electronic programming guide (EPG) information, people, tags, and other metadata. Media search service 108 may additionally include one or more Internet search engines. In an embodiment, some search results may be cached on media device 110 from data from the media search service 108 so that searches may be performed at the client when a connection to media search service 108 is unavailable.

In an embodiment, one or more of speech-to-text service 104, natural language processing service 106, and media search service 108 represent remote services that media device 110 communicates with over a network (e.g., internet, intranet, world wide web, etc.). In another embodiment, media device 110 comprises one or more of the services. In another embodiment, one or more of the services may be combined with one or more of the other services.

In an embodiment, the media device 110 connects to a computer network via a network device (e.g., a cable modem, satellite modem, telephone modem, fiber optic modem, etc.) that may be separate from the media device 110. In an example, the media device 110 is communicatively coupled, through wireless and/or wired segments, to a network device which sends and/or receives data for the media device 110.

3.0 Example Media Device

Figure 1B:
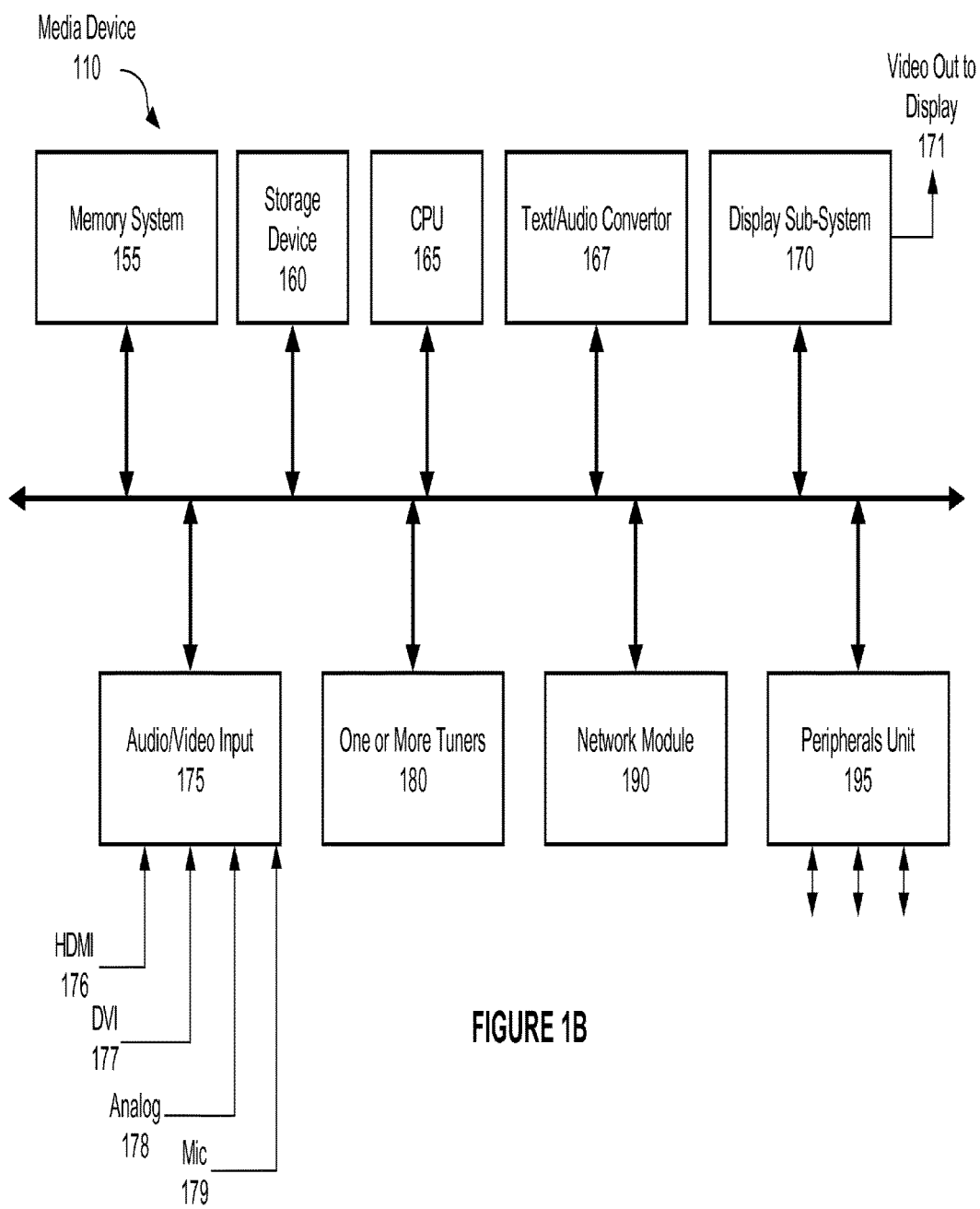
FIG. 1B is a block diagram illustrating an example media device in accordance with an embodiment.

FIG. 1B illustrates an example block diagram of a media device example in accordance with one or more embodiments. As shown in FIG. 1B, the media device 110 may include multiple components such as a memory system 155, one or more storage devices (e.g., hard drive SSD, RAM, NVRAM, etc.) 160, a central processing unit (CPU) 165, a text/audio convertor 167, a display sub-system 170, an audio/video input 175, one or more tuners (e.g., cablecard, analog tuner, digital tuner, satellite tuner, etc.) 180, a network module 190, peripherals unit 195, and/or other components necessary to perform the functionality described herein.

In an embodiment, the audio/video input 175 may correspond to any component that includes functionality to receive audio and/or video input (e.g., HDMI 176, DVI 177, Analog 178, and Microphone 179) from an external source. The media device 110 may include multiple audio/video inputs 175.

In an embodiment, the tuner 180 generally represents any input component that can receive a content stream over a transmission signal (e.g., through cable, satellite, terrestrial antenna, etc.). The tuner 180 may allow one or more received frequencies while filtering out others (e.g., by using electronic resonance, etc.). A television tuner may convert a radio frequency television transmission into audio and video signals which can be further processed to produce sound and/or an image(s).

In an embodiment, input and content may also be received from a network module 190. A network module 190 generally represents any input component that can receive information over a network (e.g., Internet, intranet, world wide web, etc.). Examples of a network module 190 include a network card, network adapter, network interface controller, network interface card, Local Area Network adapter, Ethernet network card, and/or any other component that can receive information over a network. The network module may be used to directly or indirectly connect with another device (e.g., remote devices associated with speech-to-text service 104, natural language processing service 106, the media search service 108, etc.).

In an embodiment, input may be received by the media device 110 from any communicatively coupled device through wired and/or wireless communication segments. Input received by the media device 110 may be stored to the memory system 155 or one or more storage devices 160. The memory system 155 may include one or more different types of physical memory to store data. For example, one or more memory buffers (e.g., an HD frame buffer) in the memory system 155 may include storage capacity to load one or more uncompressed high definition (HD) video frames for editing and/or fingerprinting. The memory system 155 may also store frames in a compressed format (e.g., MPEG2, MPEG4, or any other suitable format), where the frames are then uncompressed into the frame buffer for modification, replacement, and/or display. The memory system 155 may include FLASH memory, DRAM memory, EEPROM, traditional rotating disk drives, solid state drives (SSD), etc. The one or more storage devices 160 generally represent secondary or alternative embodiment storage accessible by the media device 110. The one or more storage devices 160 may include one or more different types of physical memory (e.g., disk drives, SSDs, etc.) to store various data. For example, data stored to one or more storage devices 160 may include audio data, video data, program and/or recording scheduling information, user preferences, etc.

In an embodiment, central processing unit 165 may include functionality to perform the functions described herein using any input received by the media device 110. For example, the central processing unit 165 may be configured to generate one or more services based on received voice input and to perform one or more steps corresponding to the command associated with received voice input. The central processing unit 165 may be used for processing communication with any of the input and/or output devices associated with the media device 110.

In an embodiment, the display sub-system 170 generally represents any software and/or device that includes functionality to output (e.g., Video Out to Display 171) and/or actually display one or more images. Examples of display devices include a kiosk, a hand held device, a computer screen, a monitor, a television, etc. The display devices may use different types of screens such as liquid crystal display, cathode ray tube, a projector, a plasma screen, an LED screen, etc. The output from the media device 110 may be specially formatted for the type of display device being used, the size of the display device, resolution (e.g., 720i, 720p, 1080i, 1080p, or other suitable resolution), etc.

In an embodiment, the peripherals unit 195 generally represents input and/or output for any peripherals that are communicatively coupled with the media device 110 (e.g., via USB, External Serial Advanced Technology Attachment (eSATA), Parallel ATA, Serial ATA, Bluetooth, infrared, etc.). Examples of peripherals include remote control devices, USB drives, a keyboard, a mouse, a camera, a microphone, and other speech recognition devices.

4.0 Receiving Voice Input

Figure 2:
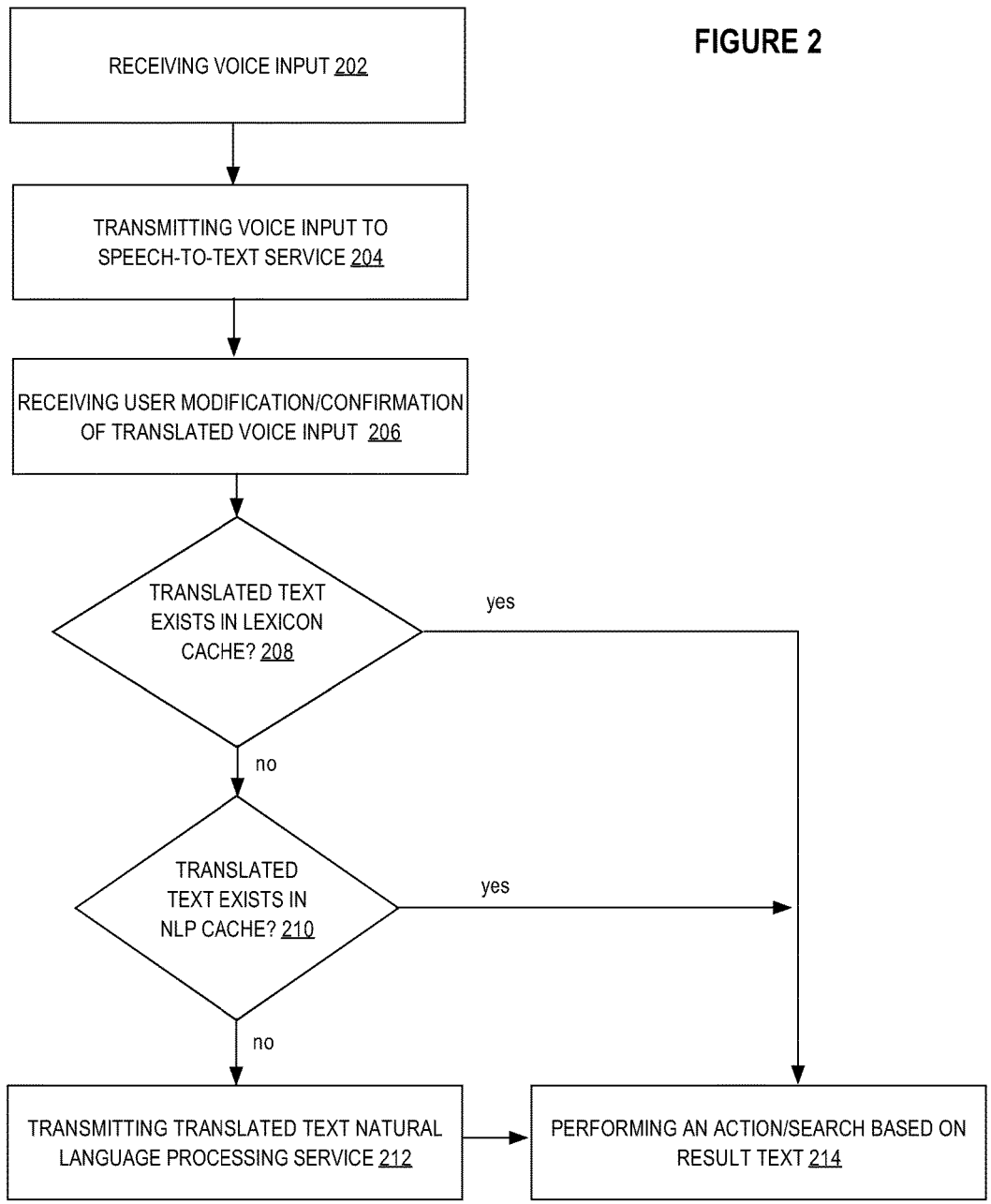
FIG. 2 illustrates a flow diagram that depicts a method for receiving and processing voice input by a media device in accordance with one or more embodiments.

FIG. 2 illustrates a flow diagram for receiving and processing voice input in accordance with one or more embodiments. One or more of the steps described below may be omitted, repeated, and/or performed in a different order. Accordingly, the specific arrangement of steps shown in FIG. 2 should not be construed as limiting the scope of the invention.

In an embodiment, in step 202 a media device 110 receives voice input from voice input device 102. As described above, voice input device 102 may be one or more microphones, or any other device capable of converting sound into an input signal. Voice input device 102 may be a separate device that is coupled to media device 110, integrated as part of media device 110, or connected to any other device that is communicatively coupled to media device 110.

In an embodiment, a media device 110 may receive an indication that a user is providing voice input. For example, a user may indicate that voice input is to be given by saying a particular keyword (e.g., by speaking the word "command" followed by additional voice input), by pressing a button or other input control associated with an input device, by making a motion or gesture detectable by an input device, or by any other input signal. In response to receiving an indication from a user that voice input is to be given, a media device 110 may begin sampling audio detected by a voice input device 102 in order to detect voice input from a user.

In another embodiment, a media device 110 (or any other associated input device) may be configured to periodically sample detectable voice input without prompting by the user. For example, a media device 110 may receive voice input by continuously processing all detectable audio input from one or more audio input devices and detecting the occurrence of a voice pattern in the audio input. For example, a media device 110 may continuously process the detectable audio input by comparing the received audio input against one or more voice samples of known users. In an embodiment, known users may be registered with the media device 110, by entering a user voice registration process and saying a phrase or set words that the media device 110 sample and stores.

In one embodiment, voice input device 102 may be enabled to be continuously active and respond to a known wake-up command for further processing. For example, voice input device 102 may transduce detectable sound to digital data for processing by media device 110 or voice input device 102. In response to detecting a wake-up command, media device 110 may process subsequently received voice input as voice commands. The media device 110 may further be enabled to identify multiple back-to-back wake-up commands. The first wake-up command would initiate processing of subsequent voice input. If the subsequent voice input is the same as the wake-up command, receipt of the second wake-up command may cause the media device to perform a predetermined task or function such as displaying EPG information. Similarly, three back-to-back wake-up commands may indicate yet another predetermined task, and so forth.

In an embodiment, a media device 110 may receive different portions of voice input from different users. For example, media device 110 may receive voice input from a first user corresponding to the text command "record", "search", etc. Additional voice input may be received from one or more second users corresponding to various titles of programs/shows that are to be associated with the "record", "search", etc., command received from the first user.

In an embodiment, voice input may be received using a microphone array comprising two or more microphones that are spatially distributed and operating in tandem. Each microphone in the array may be enabled to periodically and/or continuously sample detectable voice input. The sampled information may further include timestamp information indicating when the voice input is received by a microphone. In an embodiment, the voice input received by two or more of the microphones in a microphone array may be compared based on the recorded timestamp information. Based on a comparison of the timestamp information, the voice input that is received from a particular microphone and that is associated with the earliest timestamp information may be transmitted to a media device 110. In an embodiment, a microphone array may be used to identify the location of one or more users in an area surrounding the microphone array based on the timestamp information associated with voice input received by each microphone in an array. For example, if multiple microphones in an array detect particular voice input from a user, an approximate location of the user may be derived by using the timestamp information recorded by each of the microphones for the particular voice input and calculating an approximate distance of the user from each microphone.

In another embodiment, a microphone array may be configured to use beam forming in order to identify particular users that provide voice input. In this context, beam forming refers to audio processing techniques that enable a media device to determine an approximate spatial location of a user providing voice or other audio input. In an embodiment, one or more users initially may be identified based on voice input received from the users. For example, a user may initially be identified based on the user speaking a personalized wake-up command, based on a stored voice profile of the user, or other user identification techniques. Each of the identified users also may be associated with an approximate initial spatial location based on the voice input received from the user and using a beam forming technique. Subsequently to the initial identification of the users, a particular user may provide additional voice input received at the microphone array and a spatial location of the particular user may be determined using a beam forming technique. For example, the particular user may speak a wake-up command that does not uniquely identify the particular user. In an embodiment, the identity of the particular user providing the subsequent voice input may be determined by identifying the closest match between the approximate spatial location of the particular user providing the subsequent voice input and the approximate initial user locations.

5.0 Processing Voice Input

In an embodiment, in response to media device 110 receiving one or more voice input samples, one or more steps are executed in order to process the received voice input.

In an embodiment, media device 110 may perform one or more steps to filter out or reduce ambient noise present while voice input is being received. For example, ambient noise may be present from other objects in the environment of the user, including audio output from a media device 110. In one embodiment, in response to a user indicating that voice input is to be given, media device 110 may mute or reduce any audio output presently being generated by the media device.

In another embodiment, one or more portions of audio input received by a voice input device 102 may be filtered based on temporal audio markers embedded in audio output being generated by media device 110. For example, the temporal audio markers may be audio signals generated in one or more frequency ranges that are outside of the frequency range generally audible to humans. In an embodiment, audio data corresponding to audio output generated by media device 110, including any temporal audio markers, may be stored in a memory buffer. In an embodiment, media device 110 may correlate the audio data stored in the memory buffer with received audio input from a voice input device 102 using the temporal audio markers to locate matching audio segments. Based on the correlated audio segments, media device 110 may perform one or more processing steps to filter out or cancel the audio generated by media device 110 from the audio input data received by voice input device 102. For example, the filtering of audio generated by media device 110 may be achieved by identifying the last received audio input that correlates with audio data in the buffer. The audio input may be correlated within a difference threshold margin of similarity. Once the correlated audio data is located in the buffer, portions of the audio data in the buffer may be used to subtract out portions of the received audio input, thereby canceling the audio output by media device 110 from the received audio input.

In an embodiment, one or more users may be identified based on received voice input. For example, received voice input may be compared to data representing user voices associated with known users in order to identify a particular user. The data representing user voices may be generated based on voice training exercises performed by users, by storing previously received voice input data, or storing any other representation of a user's voice. Users may be identified during an active or passive mode. For example, users may be identified when a voice input command is received indicating the user is attempting to be recognized, or users may be identified automatically without any specific voice input command.

Although voice identification is used as an example, other means for identifying users may also be used. For example, user names may be entered via an input device (e.g., keyboard, mouse, remote, joystick, etc.). One or more input devices may include an optical sensor configured for reading user fingerprints. The user may be identified based on a fingerprint by the remote control itself or by a media device communicatively coupled to the remote control. In an embodiment, the user may be identified based on a specific button or combination of buttons selected by the user (e.g., a user code), a particular drawing/pattern entered by the user, etc. In an embodiment, a user may be identified by visual recognition of the user by a camera.

In one embodiment, a media device 110 may store user profiles and a user may be associated with a user profile based on the voice input. For example, the association of a user to a profile stored for the user may be based on the characteristics of phonemes, chronemes, and associated minimal pairs detected in the voice input. In another embodiment, associating a user with a profile is based on identifying a name or an identifier contained in the voice input. For example, to invoke a profile of a particular user, the user may speak the user's name or other identifier. In an embodiment, a user may have multiple profiles and the user may select a particular profile by speaking a unique identifier for the particular profile.

In an embodiment, each of a user's profiles may be customized for particular uses. For example, a user may create a sports focused profile that interacts particularly with sports related data on a media device 110. As an example, a user may request a listing of baseball games which are to be broadcast in the next three weeks and locate the information based on the user's sport focused profile. As another example, a user may have a movie focused profile that is used to search for and interact with movies being broadcasted. In an embodiment, user profiles may be configured via a Graphical User Interface (GUI) menu which may be navigated by voice, a remote control, or using a computer connected to the media device 110.

In another embodiment, a user may be identified and validated as a specific type of user based on the voice input or other identifying mechanism. Various user types and user permissions may be set for one or more users by a user with administrative privileges on media device 110. After a user is identified, parental controls for the identified user may be automatically enabled with the parental controls restricting certain media content associated with parental control tags or other parameters. If multiple users are identified, the most restrictive set of parental controls may be enabled. In one embodiment, the parental controls may change automatically if a new user is identified. In an embodiment, if no new user is identified for a certain amount of time, the parental control restrictions may be disabled automatically.

5.1 Speech-To-Text Translation Service

In an embodiment, voice input received by a media device 110 is transmitted to a speech-to-text service 104 in Step 204. In an embodiment, a speech-to-text service 104 translates voice input data into a textual representation of the voice input data. For example, a speech-to-text translation service may receive audio data that includes audio of a user speaking the words "tune to channel ten," or "search for horror movies." In response to receiving the audio data, a speech-to-text translation service may translate the received audio and return text data that includes the text "tune to channel ten" or "search for horror movies," the text data corresponding to the words spoken by the user and captured in the audio data. A speech-to-text conversion service may be a remote service accessible to a media device 110 over a network, or may be part of the media device 110, for example, using text/audio convertor 167.

In an embodiment, the translation of voice input into a textual representation by speech-to-text service 104 may be based on one or more user profiles. For example, a user may train a speech profile by providing one or more voice samples that are used to analyze voice input received from that user. The voice samples may include the user speaking prepared training text containing known words or phrases. A trained speech profile may improve the accuracy of a speech-to-text translation service for a particular user. User speech profiles may be stored on media device 110 or by speech-to-text service 104.

In an embodiment, the textual representation of voice input received from speech-to-text service 104 may formatted as plain text, formatted to indicate a combination of one or more of phonemes, chronemes and minimal pairs associated with the voice input, or any other representation format suitable for further textual analysis.

5.2 User Modification of Translated Voice Input

In an embodiment, a user may make one or more modifications to a textual representation of voice input received by media device 110 from a speech-to-text service 104 in Step 206. For example, one or more portions of the textual representation returned by a speech-to-text service 104 may not precisely correspond to the words that a user intended to speak. The one or more inaccurate words may result from a user not speaking clearly enough, not speaking loudly enough to be received clearly by a microphone, speaking a word that is a homophone, etc. In an embodiment, the textual representation of the user's voice input returned by a speech-to-text service 104 may be displayed on a user interface screen on one or more display devices, including a television and/or one or more remote devices, in order to provide a user an opportunity to modify or confirm the accuracy of the textual representation. In an embodiment, media device 110 may analyze the textual representation and indicate to the user unknown words based on a local dictionary. For example, one or more unknown words or phrases may be highlighted or otherwise indicated on the display and the user may optionally be presented with suggested alternative words or phrases. In an embodiment, the suggested alternative words or phrases may be derived from a media search service based on matching the words which have not been requested for replacement.

In an embodiment, a user presented with a textual representation of received voice input may modify one or more portions of the text. For example, the user may modify portions of the textual representation by using a remote control, keyboard, or other input device to change the spelling, ordering, or any other characteristics of the displayed text. In another embodiment, a user may indicate the desire to re-provide voice input for one or more portions of the displayed textual representation. For example, a user may select a portion of the displayed text and indicate that additional voice input is to be provided and re-speak the selected text portion. In response to receiving the additional voice input, the media device 110 may send the additional voice input to speech-to-text service 104 and replace the selected portion of the originally displayed textual representation with the textual representation received for the additional voice input.

After a user has made any desired modifications to the textual representation of the voice input, the user may confirm the displayed text by using a remote control, with additional voice input, or any other input commands. In another embodiment, media device 110 may accept the displayed text if no input is received from a user after a specified period of time.

5.3 Device Lexicon Cache

In an embodiment, the textual representation of voice input received from a user is compared against a set of reserved input text strings or sampled voice data stored in a device lexicon cache 112 in Step 208. A device lexicon cache is a repository of sampled voice data and/or words and word phrases that are mapped to one or more device actions, media search queries, or other commands related to applications running on a media device 110. For example, entries in a device lexicon cache 112 may include frequently used commands and phrases including "pause," "live TV," "volume up," "play my favorite show," etc. In an embodiment, if a lexicon cache 112 includes a cache entry corresponding to the textual representation of voice input received from a user, then the action or media search query stored in association with the cache entry may be processed automatically by media device 110. In another embodiment, an action associated with a cache entry may be presented for user confirmation prior to performing the action to ensure that the user intended to execute the identified action.

In an embodiment, a device lexicon cache 112 may be associated with a particular user or set of users. For example, based on the identification of a particular user, a particular device lexicon cache or set of cache entries in a device lexicon cache associated with the identified user may be searched in response to receiving voice input. The association of users with a device lexicon cache enables a cache to be personalized to include cache entries associated with a particular user. For example, a user may have a favorite television show and may desire a mapping in the device lexicon cache 112 so that in response to the user speaking the command "play my favorite show," the media device causes the most recent recording of the favorite television show to be played. In an embodiment, device lexicon cache entries may be manually added and modified by a user in order to express personalized voice input commands. In another embodiment, one or more device lexicon cache entries may be created based on monitoring usage of a media device and automatically adding frequently used voice input/device action associations.

In an embodiment, a device lexicon cache 112 may be shared between different devices and/or different device users. For example, a number of customized device lexicon cache entries may be created in association with a first user that a second user desires to use, or that the first user desires to use on a separate media device. In an embodiment, a first user may export the contents of the first user's device lexicon cache for use by other users and/or by the first user on other media devices. For example, a second user may import the first user's device lexicon cache for use on a separate device and have access to the same customized voice input/action combinations available to the first user. An imported device lexicon cache may either supplement an existing device lexicon cache or replace an existing device lexicon cache entirely. In another embodiment, user-specific device lexicon caches may be shared between different users on the same media device.

In an embodiment, a device lexicon cache may be used to implement parental controls or other filters by associating restrictions with particular device lexicon cache entries. For example, the parental controls may apply to any type of media content item, including content items from particular channels, based on content item titles, genres, etc. In an embodiment, one or more of the device lexicon cache entries may be indicated as associated with restricted media content based on one or more user preferences. In an embodiment, in response to a voice input command corresponding to a device lexicon cache entry that is associated with one or more parental controls, one or more actions and/or search results returned by the voice input command may be tagged with an indication that the content is blocked. In response to detecting a tag or other indication that the content is blocked by parental controls, a media device 110 may prevent playback of the content unless a password is provided. In an embodiment, a password may be supplied by a number or combination of input mechanisms including a remote control, additional voice input, etc.

5.4 Natural Language Processing Cache

In an embodiment, the textual representation of voice input returned by a speech-to-text translation service 104 may be used to search a natural language processing cache 114 in Step 210. A natural language processing cache 114 may be used in conjunction with a natural language processing service 106 that provides one or more natural language processing techniques. In an embodiment, natural language processing techniques may be applied to a textual representation of user voice input in order to produce a modified textual representation that may cause a media search service 108 to return more relevant results. For example, a user may specify voice input corresponding to the word phrase "get me the movie jaws" in order to search for a movie titled "Jaws." Natural language processing techniques may be used to recognize in the context of a request for media content that the words "get," "me," "the," and "movie" are extraneous in the example user's command for the purposes of a media search query and may translate the user's command into a modified textual representation including only the word "jaws."

A natural language processing cache 114 may be used to store mappings between word phrases and the text result of natural language processing on the word phrases in order to bypass the natural language processing of frequently used voice input commands. In response to determining that a cache entry exists in a natural language processing cache 114 corresponding to the textual representation of the voice input, the stored natural language processing text result may be sent to a media search service 108.

In an embodiment, a signature is generated for each word phrase that is to be stored in a natural language processing cache 114. For example, a signature may result from applying a hash algorithm to a text entry to be stored in the natural language processing cache. In an embodiment, media device 110 may similarly generate a signature for the textual representation of received voice input and use the signature to determine whether a cache entry exists in the natural language processing cache for the received voice input.

In an embodiment, a natural language processing cache 114 includes a probability or weighting value assigned to one or more of the cache entries. For example, a probability or weighting value for each cache entry may be based on one or more factors including popular keywords, popularity of associated content items, user ratings of associated content items, or based on the user selecting the presented searched items, etc. In an embodiment, a media device 110 may display one or more portions of natural language processing cache entries to a user based on the probabilities or weights assigned to one or more of natural language processing cache entries. In response to the displayed cache entries portions, a user may select a particular cache entry portion that mostly corresponds to the media query the user intended to request.

5.5 Natural Language Processing

In an embodiment, the textual representation of voice input received by a media device 110 may be processed using one or more natural language processing techniques in Step 212. In general, using natural language processing techniques to process the textual representation of voice input involves parsing the textual representations into word or word phrase tokens and categorizing the parsed tokens into one or more natural language component categories. For example, in an embodiment, natural language processing may include categorizing the text into one or more natural language components including noun and noun phrases, verb and verb phrases, pronouns, prepositions, etc. In an embodiment, based on the parsed and categorized representation of the textual representation of voice input, particular words or word phrases may be filtered out in order to formulate a more focused media content search query.

In an embodiment, the textual representation of the voice input is transmitted to a natural language processing service 106. Natural language processing service 106 processes the textual representation using one or more of the natural language processing techniques described above and returns a version of the textual representation that may include one or more modifications. In an embodiment, the modified textual representation and any other metadata associated with the natural language processing process may be stored in natural language processing cache 114 in association with the input textual representation.

5.6 Media Content Search

In an embodiment, a media device 110 transmits a search query to a media search service 108 based on the textual representation of the voice input in Step 214. A search query transmitted to a media search service 108 by a media device 110 may include one or more modifications to the textual representation based on one or more of the processing steps described above. For example, a media device 110 may generate a search query that is transmitted to search module 415 based on one or more of: the textual representation of voice input received from a speech-to-text service 104, the textual representation of voice input after user modification, cache entries located in the device lexicon cache 112 and/or natural language processing cache 114, and the textual representation after natural language processing. In an embodiment, search queries generated by media device 110 may be used to search for media content item results and associated information including, but not limited to, media content program titles, media content scheduling information, media device application content, or tags associated with media content.

In an embodiment, a media search service 108 may transmit search results to media device 110 for each submitted query, or a media search service 108 may aggregate results from multiple queries based on the same voice input and transmit search results based on a union of the search results generated for each of multiple queries.

6.0 Processing Media Content Search Results

Figure 3:
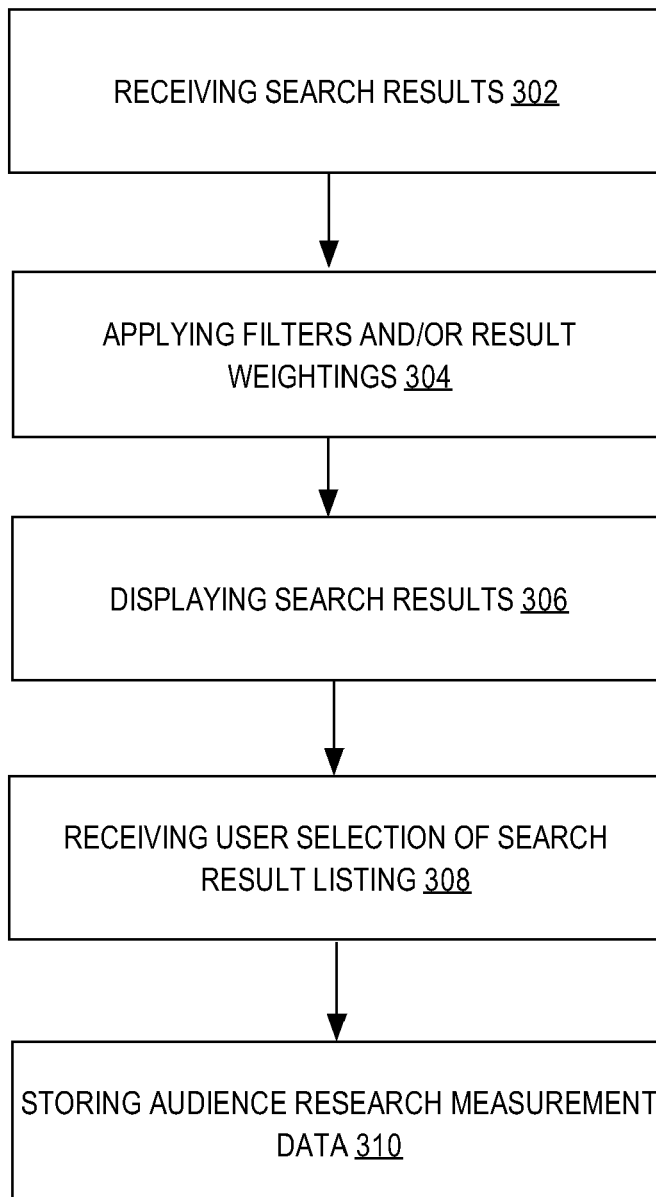
FIG. 3 illustrates a flow diagram example for processing results returned from a media search service in accordance with an embodiment.

FIG. 3 illustrates a flow diagram for processing search results received from a media search service 108. One or more of the steps described below may be omitted, repeated, and/or performed in a different order. Accordingly, the specific arrangement of steps shown in FIG. 3 should not be construed as limiting the scope of the invention.

In an embodiment, the search results are received by a media device 110 from a media search service 108 in Step 302. Search results may include one or more content item listings and any other additional data associated with media content represented by the content item listings. For example, the search results may include information associated with one or more content item listings including title information, synopsis, scheduling information, actor or actress names, etc.

6.1 Search Result Weighting

In an embodiment, one or more search result weighting and/or filtering techniques may be applied to results generated by media search service 108 in Step 304. The listing of content items included in the results generated by media search service 108 based only upon alphabetical ordering may result in a search result listing where relevant search results appear lower on the list of possible search results. When searching for a result in a large data set, providing sorting based upon relevancy of the possible results may make the search more efficient. In an embodiment, search result weighting and filtering may be based on one or more factors including usage patterns, global statistics, filter words received in the input, etc.

In an embodiment, the weighting of media content item listings in a set of search results may be based on global and/or user-dependent information. For example, popular shows may be displayed higher in the result list, wherein the popularity is based on the past viewing habits of the user initiating the search and/or a plurality of users across a number of media devices. For example, media search service 108 may access global usage information and apply a weighting to one or more content item listings based on the viewing/recording patterns of a plurality of users before sending the results back to media device 110.

In an embodiment, one or more filters may be applied to search results received from a media search service 108. In an embodiment, filters may be based on one or more words identified in the textual representation of the voice input received from a user. For example, filter words may be associated with various media content categories including, for example, movies, television shows, sports, cartoons, and news. For example, a media device 110 may receive a voice input that is translated into the textual representation: "get me all movies currently playing." In the example, the word "movies" may be detected as a filter word based on a stored list of filter words. In response to identifying the one or more filter words, media device 110 may filter out search results that are not in the identified filter category or display search result listings that are in the filter category higher in the result list. In an embodiment, the identification of filter words may occur during the natural language processing of the translated text representing the voice input by natural language processing service 106. In another embodiment, filter words may be identified by one or more media device 110, speech-to-text service 104, or media search service 108, and used to filter the returned search results.

In an embodiment, a media device 110 may apply one or more filters to search results based on one or more stored user preferences. For example, media device 110 may apply one or more stored parental controls to filter search results returned by media search service 108. In an embodiment, parental control filtering may be based on information associated with a content item listing including the title of the content, rating of the content, tags, or any other information associated with the result listings. For example, parental controls may be set to filter search results corresponding to movies that have an "R" film-rating. In an embodiment, parental controls may be specific to the user providing the voice input. For example, one or more users may be identified based on received voice input and media device 110 may apply one or more parental control settings associated with the identified users.

6.2 User Selection of Media Content Search Results

In an embodiment, after media device 110 applies any filters, weighting, or other modifications to the list of content item results received from media search service 108, the content items results may be displayed to a user in Step 306. For example, the results may be displayed to a user by display sub-system 170 to one or more of the display devices, including the display on a television or on a display associated with one or more remote devices.

In an embodiment, a user may select one or more particular content item listing from a set of results using any available input device in Step 308. For example, a user may scroll through a list of content item results and select one or more content item listings using a remote control. In another embodiment, a user may make a selection on a remote device that transmits the user's selection to media device 110. In an embodiment, in response to a user's selection of a particular content item listing, the user may be presented with one or more selectable actions associated with the selected content item listing, including actions to view the associated media content, schedule a recording, search for related content, or other types of actions.

In another embodiment, a user may select a content item listing presented as part of the set of search results using voice input. For example, in response to media device 110 receiving voice input while one or more results are currently displayed, media device 110 may process the received voice input using one or more of the techniques described above.

6.3 Collection of Audience Research and Measurement Data

In an embodiment, in response to a user selection of one or more particular content item listings from a set of search results returned by a media search service 108, information associated with the user selection is stored and/or transmitted as part of audience research and measurement data in Step 310. In an embodiment, audience research and measurement data includes information associated with user actions performed on a media device 110 and the data may be used to analyze how users interact with media devices and media content. For example, audience research and measurement data may include various data associated with media devices and multimedia content such as, for example, when particular programs are watched, a number of media device users that watch a particular program, what portions of a particular program are watched, etc.

In an embodiment, data associated with a user's selection of one or more particular content items may be transmitted by a media device 110 to a server collecting audience research and measurement data. The associated data may be transmitted immediately in response to the user's selection of a particular result listing or, alternatively, the data may be stored locally and periodically transmitted to a collection server. The associated data may include any information relating to the user's selection including one or more identifiers of the selected content items selected, one or more search queries that generated selected content items, a user action performed in response to selection of the content items, etc. The collected data may be used, for example, as part of the weighting information used to order search results returned by a media search service 108 in Step 304. For example, audience research and measurement data indicating that a particular program is frequently selected and watched by other users may result in the particular program being shown higher in a content item search listing.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
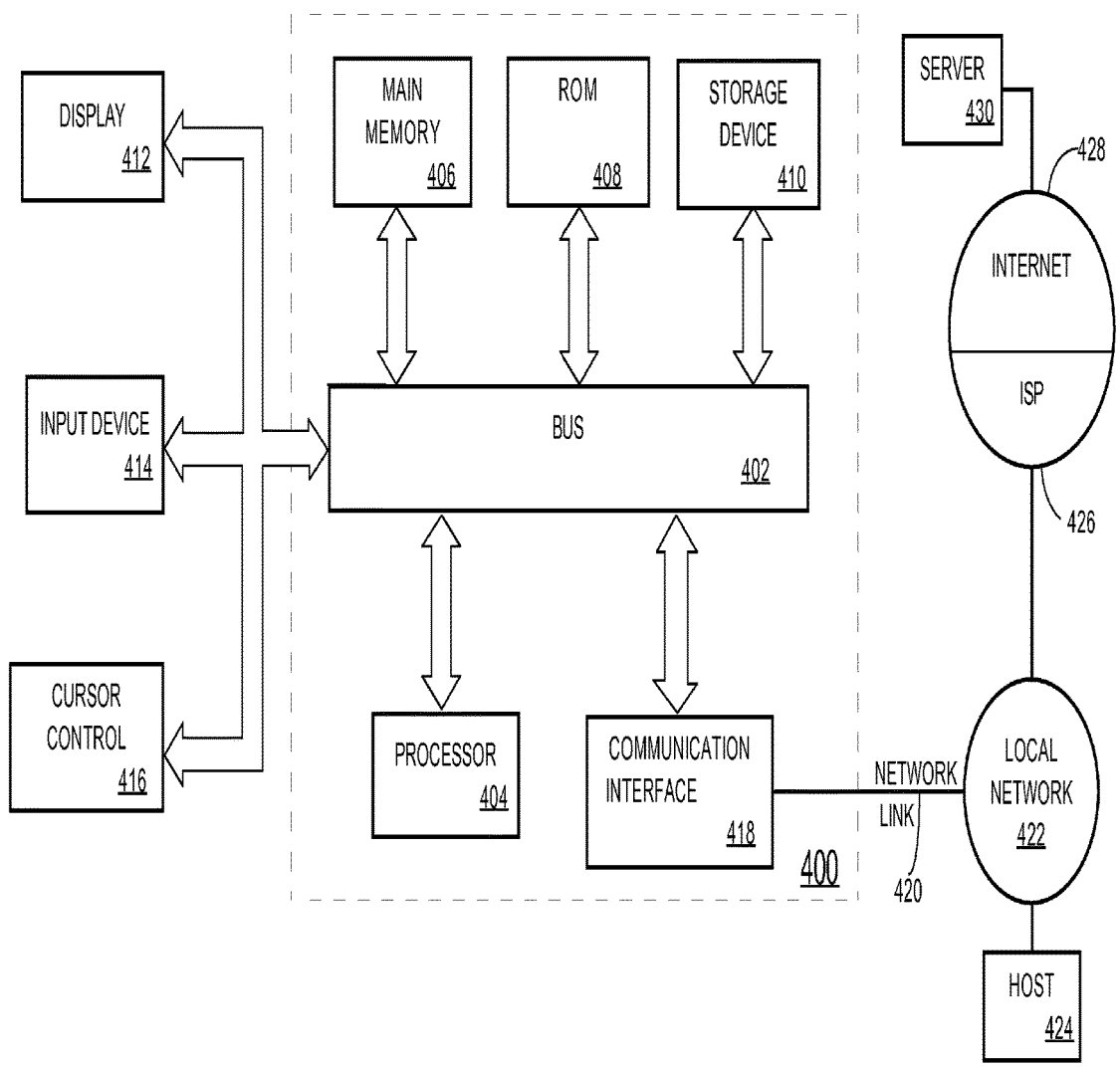
FIG. 4 shows a block diagram that illustrates a system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a flat panel display, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

8.0 Extensions and Alternatives

Embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense. Any combination of the features, functionalities, components, and example embodiments described herein may be implemented.

The invention claimed is:

1. A method comprising:
receiving voice input data at a media device;
determining whether the voice input corresponds to one of a plurality of commands;
in response to determining that the voice input corresponds to one of the plurality of commands, executing the command;
in response to determining that the voice input does not correspond to one of the plurality of commands, sending the voice input data to a speech-to-text service;
receiving, by the media device from the speech-to-text service, a textual representation of at least a portion of the voice input data;
generating a signature based on at least a portion of the textual representation;
locating a particular data entry among a set of data entries by searching the set of data entries for a data entry matching the signature generated based on the at least a portion of the textual representation, each data entry of the set of data entries specifying a mapping between a given signature and one or more media device actions;
updating the set of data entries by storing the mapping between the signature and the at least a portion of the textual representation;
in response to locating the particular data entry among the set of data entries based on the generated signature, performing one or more particular media device actions associated with the particular data entry, the one or more particular media device actions including sending a media content query to a media search service;
receiving, by the media device, one or more content item listings based on the media content query; and
generating for display at least a portion of the one or more content item listings.

2. The method of claim 1, wherein the textual representation of the at least a portion of the voice input data is a textual representation of an entire voice input data.

3. The method of claim 1, wherein generating the signature based on the at least a portion of the textual representation, comprises generating the signature based on the entire textual representation.

4. The method of claim 1, further comprising:
determining whether an unknown word exists in the at least a portion of the textual representation; and
in response to determining that the unknown word exists in the at least a portion of the textual representation, visually distinguishing the unknown word from other words.

5. The method of claim 1, further comprising:
generating for display the at least a portion of the textual representation;
receiving a user selection of a portion of the at least a portion of the textual representation;
receiving additional voice input data;
transmitting the additional voice input data to the speech-to-text service;
receiving from the speech-to-text service, an additional textual representation of the additional voice input data; and
replacing the displayed portion of the at least a portion of the textual representation with the additional textual representation.

6. The method of claim 1, wherein searching the set of data entries for the data entry matching the signature generated based on the at least a portion of the textual representation comprises determining that a data entry matches the signature generated based on a probability assigned to a data entry in a plurality of data entries.

7. The method of claim 1, wherein receiving, by the media device, the one or more content item listings based on the media content query comprises:
determining a relevancy to the media content query of one or more content item listings based on a weighting of the one or more content item listings; and
receiving the one or more content item listings based upon the determined relevancy.

8. The method of claim 1, wherein receiving, by the media device, one or more content item listings based on the media content query comprises receiving the one or more content item listings based upon a relevancy of a search result in a plurality of search results to the media content query, wherein the relevancy is determined using search result filtering.

9. The method of claim 1, wherein receiving, by the media device, the one or more content item listings based on the media content query comprises receiving the one or more content item listings from the media search service.

10. The method of claim 1, further comprising:
determining whether an extraneous portion of the at least a portion of the textual representation exists; and
in response to determining that the extraneous portion exists, removing the extraneous portion from the at least a portion of the textual representation.

11. A system comprising:
control circuitry configured to:
receive voice input data at a media device;
determine whether the voice input corresponds to one of a plurality of commands;
in response to the determination that the voice input corresponds to one of the plurality of commands, execute the command;

in response the determination that the voice input does not correspond to one of the plurality of commands, send the voice input data to a speech-to-text service;

receive, by the media device from the speech-to-text service, a textual representation of at least a portion of the voice input data;

generate a signature based on at least a portion of the textual representation;

locate a particular data entry among a set of data entries by searching the set of data entries for a data entry matching the signature generated based on the at least a portion of the textual representation, each data entry of the set of data entries specifying a mapping between a given signature and one or more media device actions;

update the set of data entries by storing the mapping between the signature and the at least a portion of the textual representation;

in response to the location of the particular data entry among the set of data entries based on the generated signature, perform one or more particular media device actions associated with the particular data entry, the one or more particular media device actions including sending a media content query to a media search service;

receive, by the media device, one or more content item listings based on the media content query; and generate for display at least a portion of the one or more content item listings.

12. The system of claim 11, wherein the textual representation of the at least a portion of the voice input data is a textual representation of an entire voice input data.

13. The system of claim 11, wherein the control circuitry is further configured, when generating the signature based on the at least a portion of the textual representation, to generate the signature based on the entire textual representation.

14. The system of claim 11, wherein the control circuitry is further configured to:
determine whether an unknown word exists in the textual representation; and
in response to determining that the unknown word exists in the textual representation, visually distinguish the unknown word from other words.

15. The system of claim 11, wherein the control circuitry is further configured to:
generate for display the at least a portion of the textual representation;
receive a user selection of a portion of the at least a portion of the textual representation;
receive additional voice input data;
transmit the additional voice input data to the speech-to-text service;
receive from the speech-to-text service, an additional textual representation of the additional voice input data; and
replace the displayed portion of the at least a portion of the textual representation with the additional textual representation.

16. The system of claim 11, wherein the control circuity is further configured, when searching the set of data entries for the data entry matching the signature generated based on the at least a portion of the textual representation, to determine that a data entry matches the signature generated based on a probability assigned to a data entry in a plurality of data entries.

17. The system of claim 11, wherein the control circuitry is further configured, when receiving the one or more content item listings based on the media content query, to:
determine a relevancy to the media content query of one or more content item listings based on a weighting of the one or more content item listings; and
receive the one or more content item listings based upon the determined relevancy.

18. The system of claim 11, wherein the control circuitry is further configured, when receiving the one or more content item listings based on the media content query, to receive the one or more content item listings based upon a relevancy of a search result in a plurality of search results to the media content query, wherein the relevancy is determined using search result filtering.

19. The system of claim 11, wherein the control circuitry is further configured, when receiving the one or more content item listings based on the media content query, to receive the one or more content item listings from the media search service.

20. The system of claim 11, wherein the control circuitry is further configured to:
determine whether an extraneous portion of the at least a portion of the textual representation exists; and
in response to determining that the extraneous portion exists, remove the extraneous portion from the at least a portion of the textual representation.

* * * * *